United States Patent
Tulluri et al.

(10) Patent No.: US 10,558,960 B2
(45) Date of Patent: Feb. 11, 2020

(54) CASH PAYMENT FOR REMOTE TRANSACTIONS

(71) Applicant: The Western Union Company

(72) Inventors: Gupta Sesha Raghavendra Tulluri, Victoria (AU); Mark Thompson, Denver, CO (US); Dean A. Seifert, Parker, CO (US)

(73) Assignee: The Western Union Company, Denver, CO (US)

( * ) Notice: Subject to any disclaimer, the term of this patent is extended or adjusted under 35 U.S.C. 154(b) by 1212 days.

(21) Appl. No.: 14/829,542

(22) Filed: Aug. 18, 2015

(65) Prior Publication Data

US 2016/0048818 A1 Feb. 18, 2016

Related U.S. Application Data

(63) Continuation of application No. 13/916,234, filed on Jun. 12, 2013, which is a continuation of application No. 11/284,535, filed on Nov. 21, 2005, now Pat. No. 8,494,956, which is a continuation-in-part of application No. 10/855,666, filed on May 26, 2004, now Pat. No. 8,051,003, which is a continuation of application No. 10/040,568, filed on Jan. 4, 2002, now Pat. No. 6,814,282, which is a
(Continued)

(51) Int. Cl.
*G06Q 40/00* (2012.01)
*G06Q 20/10* (2012.01)

(52) U.S. Cl.
CPC .............................. *G06Q 20/1085* (2013.01)

(58) Field of Classification Search
None
See application file for complete search history.

(56) References Cited

U.S. PATENT DOCUMENTS 4,032,931 A 6/1977 Haker
4,454,414 A 6/1984 Benton
(Continued)

FOREIGN PATENT DOCUMENTS

EP 0949596 10/1999
EP 1077436 2/2001
(Continued)

OTHER PUBLICATIONS

Author Unknown "Online Payment Services" www.auctionbytes.com-cab-pages-payment, compiled Nov. 2002, 3 pages.
(Continued)

*Primary Examiner* — Jason Borlinghaus
(74) *Attorney, Agent, or Firm* — Kilpatrick Townsend & Stockton LLP

(57) ABSTRACT

One method for transferring funds includes receiving at a web server computer a request to transfer funds from a sender to a receiver. The request includes information identifying the sender and a payment vehicle for providing funds to transfer. The payment vehicle is validated and a transaction identifier is generated or assigned. The transaction identifier may be transmitted from the web server computer to the sender. When ready to receive the funds, the transaction identifier is entered into an ATM. If the transaction identifier is validated, the funds are dispensed from the ATM.

12 Claims, 9 Drawing Sheets

Related U.S. Application Data continuation-in-part of application No. 09/427,249, filed on Oct. 26, 1999, now Pat. No. 6,488,203, said application No. 11/284,535 is a continuation-in-part of application No. 10/037,827, filed on Jan. 3, 2002, now Pat. No. 7,617,157, and a continuation-in-part of application No. 09/975,171, filed on Oct. 10, 2001, now abandoned.

(56) References Cited

U.S. PATENT DOCUMENTS

| | | |
|---|---|---|
| 4,523,087 A | 6/1985 | Benton |
| 4,641,239 A | 2/1987 | Takesako |
| 5,021,967 A | 1/1991 | Smith |
| 5,083,272 A | 1/1992 | Walker et al. |
| 5,132,521 A | 7/1992 | Smith et al. |
| 5,220,501 A | 6/1993 | Lawlor et al. |
| 5,283,829 A | 2/1994 | Anderson |
| 5,311,595 A | 5/1994 | Bjerrum et al. |
| 5,326,960 A | 7/1994 | Tannenbaum |
| 5,350,906 A | 9/1994 | Brody et al. |
| 5,461,217 A | 10/1995 | Claus |
| 5,477,037 A | 12/1995 | Berger |
| 5,477,038 A | 12/1995 | Levine et al. |
| 5,570,465 A | 10/1996 | Tsakanikas |
| 5,650,604 A | 7/1997 | Marcous et al. |
| 5,691,525 A | 11/1997 | Aoki et al. |
| 5,696,908 A | 12/1997 | Muehlberger et al. |
| 5,717,868 A | 2/1998 | James |
| 5,721,768 A | 2/1998 | Stimson et al. |
| 5,732,136 A | 3/1998 | Murphree et al. |
| 5,745,886 A | 4/1998 | Rosen |
| 5,764,888 A | 6/1998 | Bolan et al. |
| 5,774,879 A | 6/1998 | Custy et al. |
| 5,779,379 A | 7/1998 | Mason et al. |
| 5,787,403 A | 7/1998 | Randle |
| 5,799,087 A | 8/1998 | Rosen |
| 5,826,241 A | 10/1998 | Stein et al. |
| 5,875,435 A | 2/1999 | Brown |
| 5,896,298 A | 4/1999 | Richter |
| 5,897,620 A | 4/1999 | Walker et al. |
| 5,897,989 A | 4/1999 | Beecham |
| 5,898,154 A | 4/1999 | Rosen |
| 5,899,982 A | 5/1999 | Randle |
| 5,902,983 A | 5/1999 | Crevelt et al. |
| 5,903,881 A | 5/1999 | Schrader et al. |
| 5,909,673 A | 6/1999 | Gregory |
| 5,913,202 A | 6/1999 | Motoyama |
| 5,920,629 A | 7/1999 | Rosen |
| 5,920,848 A | 7/1999 | Schutzer et al. |
| 5,933,816 A | 8/1999 | Zeanah et al. |
| 5,936,221 A | 8/1999 | Corder et al. |
| 5,937,396 A | 8/1999 | Konya |
| 5,949,044 A | 9/1999 | Walker et al. |
| 5,952,639 A | 9/1999 | Ohki et al. |
| 5,953,703 A | 9/1999 | Takeuchi et al. |
| 5,953,709 A | 9/1999 | Gilbert et al. |
| 5,953,710 A | 9/1999 | Fleming |
| 5,963,647 A | 10/1999 | Downing et al. |
| RE36,365 E | 11/1999 | Levine et al. |
| 5,993,047 A | 11/1999 | Novogrod et al. |
| 6,003,763 A | 12/1999 | Gallagher et al. |
| 6,012,048 A | 1/2000 | Gustin et al. |
| 6,015,087 A | 1/2000 | Seifert et al. |
| 6,027,216 A | 2/2000 | Guyton |
| 6,032,137 A | 2/2000 | Ballard |
| 6,035,406 A | 3/2000 | Moussa et al. |
| 6,039,250 A | 3/2000 | Ito et al. |
| 6,044,360 A | 3/2000 | Picciallo |
| 6,045,039 A | 4/2000 | Stinson et al. |
| 6,064,990 A | 5/2000 | Goldsmith |
| 6,070,156 A | 5/2000 | Hartsell et al. |
| 6,088,684 A | 7/2000 | Custy et al. |
| 6,098,053 A | 8/2000 | Slater |
| 6,119,106 A * | 9/2000 | Mersky .............. G06Q 20/102 705/40 |
| 6,119,931 A | 9/2000 | Novogrod |
| 6,122,625 A | 9/2000 | Rosen |
| 6,145,738 A | 11/2000 | Stinson et al. |
| 6,149,056 A | 11/2000 | Stinson et al. |
| 6,206,283 B1 | 3/2001 | Bansal et al. |
| 6,209,104 B1 | 3/2001 | Jalil |
| RE37,122 E | 4/2001 | Levine et al. |
| 6,223,168 B1 | 4/2001 | McGurl et al. |
| 6,250,557 B1 | 6/2001 | Forslund et al. |
| 6,275,829 B1 | 8/2001 | Angiulo et al. |
| 6,282,523 B1 | 8/2001 | Tedesco et al. |
| 6,286,756 B1 | 9/2001 | Stinson et al. |
| 6,292,789 B1 | 9/2001 | Schutzer |
| 6,314,169 B1 | 11/2001 | Schelberg, Jr. et al. |
| 6,324,522 B2 | 11/2001 | Peterson et al. |
| 6,332,134 B1 | 12/2001 | Foster |
| 6,351,739 B1 | 2/2002 | Egendorf |
| 6,367,693 B1 | 4/2002 | Novogrod |
| 6,394,343 B1 | 5/2002 | Berg et al. |
| 6,415,271 B1 | 7/2002 | Turk et al. |
| 6,473,500 B1 | 10/2002 | Risafi et al. |
| 6,488,203 B1 | 12/2002 | Stoutenburg et al. |
| 6,502,747 B1 | 1/2003 | Stoutenburg et al. |
| 6,547,132 B1 | 4/2003 | Templeton |
| 6,554,184 B1 * | 4/2003 | Amos ................ G06Q 20/108 235/379 |
| RE38,255 E | 9/2003 | Levine et al. |
| 6,736,314 B2 | 5/2004 | Cooper et al. |
| 6,761,309 B2 | 7/2004 | Stoutenburg et al. |
| 6,868,391 B1 | 3/2005 | Hultgren |
| 7,070,094 B2 | 7/2006 | Stoutenburg et al. |
| 7,366,695 B1 | 4/2008 | Rouman |
| 2001/0011248 A1 * | 8/2001 | Himmel .............. G06Q 20/10 705/39 |
| 2001/0037281 A1 | 11/2001 | French |
| 2001/0042785 A1 | 11/2001 | Walker et al. |
| 2002/0016763 A1 | 2/2002 | March |
| 2002/0026373 A1 | 2/2002 | Sudesh et al. |
| 2002/0062285 A1 | 5/2002 | Amann et al. |
| 2002/0087462 A1 | 7/2002 | Stoutenburg et al. |
| 2003/0028491 A1 | 2/2003 | Cooper et al. |
| 2003/0069856 A1 | 4/2003 | Seifert et al. |
| 2003/0080185 A1 | 5/2003 | Werther |
| 2003/0083987 A1 | 5/2003 | Stoutenburg et al. |
| 2003/0126083 A1 | 7/2003 | Seifert et al. |
| 2003/0140004 A1 | 7/2003 | O'Leary et al. |
| 2003/0149662 A1 | 8/2003 | Shore |
| 2003/0233317 A1 | 12/2003 | Judd |
| 2004/0088248 A1 | 5/2004 | Cutler |
| 2004/0211831 A1 | 10/2004 | Stoutenburg et al. |
| 2005/0121513 A1 | 6/2005 | Drummond et al. |
| 2005/0131816 A1 | 6/2005 | Britto et al. |
| 2006/0131387 A1 | 6/2006 | Hansen et al. |
| 2006/0143118 A1 | 6/2006 | Seifert et al. |
| 2006/0191999 A1 | 8/2006 | Stoutenburg et al. |
| 2008/0215487 A1 | 9/2008 | Stoutenburg et al. |

FOREIGN PATENT DOCUMENTS

| | | |
|---|---|---|
| FR | 2699358 | 6/1994 |
| WO | 96-026508 | 8/1996 |
| WO | 98-036521 | 8/1998 |
| WO | 00-22559 | 4/2000 |
| WO | 00-67177 | 11/2000 |
| WO | 01-04816 | 1/2001 |
| WO | 01-39093 | 5/2001 |
| WO | 03-60635 | 7/2003 |

OTHER PUBLICATIONS

Author Unknown "PayPal News", www.andrys.com-paypal.html, published prior to 2003, 3 pages.
Author Unknown "PayPal.com Case Study" http:--fox.rollins.edu--slackman-paypal.htm, 2001, 6 pages.

(56) References Cited

OTHER PUBLICATIONS

Bernstein, Phillip A., Newcomer, Eric, *Principles of Transaction Processing for the Systems Professional*, Morgan Kaufmann Publishers, 1997, p. 24.
Boneh, Dan "Beaming Money by Email is Web's Next killer App", PR Newswire, Nov. 16, 1999, 4 pgs.
Business Editors and High-Tech Writers "billserv.com Launches bills. com, an Internet Portal for Consumers to Pay Bills Online at No Cost" Business Wire, Feb. 22, 2000, 2 pgs.
Confinity, Inc. "PayPal for the Palm", www.handheldnew.com-file.asp?ObjectiD=5401, published prior to Oct. 2003, 2 pages.
Disclosure Under 37 CFR 1.56 dated Dec. 15, 2008, filed for U.S. Appl. No. 10/037,827.
Epper Hoffman, Karen "PayPal Still Running Free, but thee-payments company's carefree days may be numbered if 8 regulators decide it's essentially a bank" Bank Technology News, published between 2001-2003, www.banktechnews.com-btn-articles-btnoct01-13.shtml, 3 pages.
Garfinkel, Simson & Spafford, Gene. Web Security Privacy & Commerce. O'Reilly, 2nd Edition, Nov. 1, 2001, pp. 125-129, 554-555 and 621-622 (9 pgs.).
International Preliminary Examination Report dated Aug. 28, 2002 and Search Report dated May 31,2001 for PCT-US2000-041572.
International Search Report for PCT-US2002-039933, dated Nov. 5, 2004.
International Search Report for PCT-US2002-040556, dated Jul. 15, 2003.
International Search Report WO 2007061505 for PCT-US2006-037888 dated May 22, 2007.
Latour, Almar. "PayPal Electronic Plan May be on the Money in Years to Come", The Wall Street Journal Interactive Edition, Nov. 15, 1999, downloaded from www.paypal.com-html-wsj.html, 2 pages.
New commercial services from Western Union allow businesses to directly transfer money internationally; User companies can now send or receive money at their own offices through on-line connection to world's largest international money transfer network, Business Wire, Oct. 16, 1995, 1 pg.
Plotkin, Hal "Beam Me Up Some Cash" Silicon Valley Insider, Sep. 8, 1999, www.halplotkin.com-cnbcs029.htm, 3 pages.
Steiner, Ina "PayPal Online Payment Service—Another Way to Pay for Auction items" www.auctionbytes.com, Feb. 20, 2000, 4 pages.
Supplementary European Search Report for EP 02 79 2380 dated May 7, 2009 and dated May 14, 2009.
United States Court of Appeal for the Federal Court—*The Western Union Company*, Plaintiff-Appellee, v. *Moneygram Payment Systems, Inc.*, Defendant-Appellant—2010-1080, 1210 Decided Dec. 7, 2010.
U.S. Appl. No. 09/634,901, Point of Sale Payment Terminal, filed Aug. 9, 2000.
U.S. Appl. No. 60/147,899, Integrated Point of Sale Device, filed Aug. 9, 1999.
Western Union Money Transfer, "How to Send a Money Transfer," 2001-2004.
Wijnen, Rene "You've Got Money!", Bank Technology News, Jun. 2000, pp. 1-4, vol. 13, Issue 6, New York.

\* cited by examiner

CASH PAYMENT FOR REMOTE TRANSACTIONS

This application is a continuation of U.S. application Ser. No. 13/916,234, filed Jun. 12, 2013, entitled, "INTERNET FUNDS TRANSFER SYSTEM USING ATM PICKUP," which is a continuation of U.S. Pat. No. 8,494,956, filed Nov. 21, 2005, issued Jul. 23, 2013, entitled "INTERNET FUNDS TRANSFER SYSTEM USING ATM PICKUP," which is a continuation-in-part of U.S. Pat. No. 8,051,003, filed May 26, 2004, issued Nov. 1, 2011, entitled, "SYSTEMS AND METHODS OF INTRODUCING AND RECEIVING INFORMATION ACROSS A COMPUTER NETWORK," which is a continuation of U.S. Pat. No. 6,814,282, filed Jan. 4, 2002, issued Nov. 9, 2004, entitled "SYSTEMS AND METHODS OF INTRODUCING AND RECEIVING INFORMATION ACROSS A COMPUTER NETWORK," which is a continuation-in-part of U.S. Pat. No. 6,488,203, filed Oct. 26, 1999, issued Dec. 3, 2002, entitled "METHOD AND SYSTEM FOR PERFORMING MONEY TRANSFER TRANSACTIONS," the complete disclosures of which are herein incorporated by reference. The aforementioned patent, U.S. Pat. No. 8,494,956, filed Nov. 21, 2005, issued Jul. 23, 2013, is a continuation-in-part of U.S. Pat. No. 7,617,157, issued Nov. 10, 2009, entitled "METHODS FOR RECEIVING ELECTRONICALLY TRANSFERRED FUNDS USING AN AUTOMATED TELLER MACHINE," U.S. application Ser. No. 09/975,171, filed Oct. 10, 2001, now abandoned, entitled "METHOD AND SYSTEM FOR PERFORMING MONEY TRANSACTIONS," and the complete disclosures of which are herein incorporated by reference.

BACKGROUND OF THE INVENTION

The present invention relates generally to computer-implemented transfer systems including systems and methods for introducing information to and receiving information from a computer-implemented transfer system. More specifically, the invention relates to transferring value and/or messages associated with the value via a computer-implemented transfer system.

Various mechanisms exist for transferring information across a computer network. For example, email may be sent from one person to another across a computer network or money may be transferred across a computer network from one account to another. However, each of the existing transfer mechanisms requires both a sender and a receiver involved in the transfer to have access to a common transfer medium. Thus, as an example, to transfer information across an email system both the sender and receiver must have access to an email account. Similarly, to transfer money from one account to another both the receiver and the sender must have accessible accounts. In many instances, the receiver and the sender do not have access to common systems and therefor must use alternative means to transfer information including, for example, the United States postal system.

Furthermore, even where both the receiver and the sender share access to a common transfer medium, use of the medium is often cumbersome causing senders to use alternative means to transfer information and/or value. For example, a business and its suppliers may both have bank accounts making a money transfer possible, however, it is typical for a business to issue checks and send them through the United States postal service to pay the suppliers.

Thus, there exists a need in the art to increase accessibility to provide increased access to computer-implemented transfer systems and reduce the cumbersome nature of such transfer systems. These and other deficiencies in the prior art are addressed by the present invention.

BRIEF SUMMARY OF THE INVENTION

The invention provides a wide variety of money transfer systems, components of such money transfer systems, and methods for electronically transferring money. Broadly speaking, the invention permits money to be received in some form and then electronically transferred to another location where it is available for pickup. A wide variety of systems and techniques may be used to access the money transfer system, to provide the money to the money transfer system to transfer the money, and to pay out the transferred money to a recipient.

For example, the money transfer system may be accessed by walking into a money transfer or provider location and tendering payment, using a telephone to contact an IVR system or a customer service representative, over the Internet using any type of device capable of communicating over the Internet, including personal computers, cell phones with browsers, PDAs and the like. Conveniently, payment may be tendered in cash, by credit card, debit card, stored value cards, including smart cards, using an Automated Clearing House (ACH) transfer from a bank account, using a cash card that is presentable at a provider terminal or point of sale device to receive cash, and the like. The recipient may be paid by cash, check, by crediting a bank account, crediting of a stored value card, and the like. Further various payment techniques may be used, such as in person at a money transfer location (i.e. an entity working on behalf of a financial institution to transfer funds), by an ACH transfer to a bank account, by a Fed wire to a bank account, using ATMs, kiosks, stored value cards, automated check printers, and the like.

In one embodiment, the invention provides a method for transferring funds. According to the method, a request is received at a web server computer to transfer funds from a sender to a receiver. The request includes information identifying the sender and a payment vehicle for providing funds to transfer. The payment vehicle is validated and a transaction identifier is generated. The transaction identifier is transmitted from the web server computer to the sender. When ready to receive the funds, the transaction identifier is entered into an automated teller machine (ATM). If the transaction identifier is validated, the funds are dispensed.

In one aspect, information is received at the web server computer regarding a pick-up location of the receiver, and the web server computer transmits information on nearby ATM locations where the funds may be received. Optionally, a pass code may be generated and transmitted to the sender. This pass code may be validated before dispensing the funds.

The receiver may be notified of the transfer in a variety of ways. For example, an electronic message may be transmitted to the receiver with the transaction identifier. Alternatively, or in addition, a message may be sent to a telephone of the receiver with the transaction identifier. In another optional feature, the web server computer may send to the sender status information on the request to transfer funds. When the funds are dispensed, a notice may also be send to the sender. In another aspect, the transaction identifier is input into the ATM using a keypad.

In one particular embodiment, funds may be electronically transmitted by a sender entering a request to transfer funds to a receiver into a sender computer using a web page. The request may include information identifying the sender and a payment vehicle for providing the funds to transfer. The request is transmitted to a host computer system where the payment vehicle is validated and a transaction identifier is generated. The transaction identifier is transmitted to the sender computer using the host computer system. Also, the transaction identifier and an approved funding amount is transmitted from the host computer system to an ATM system. When ready to pick-up the funds, a receiver inputs into an ATM the transaction identifier which is validated using the ATM system. At least some of the approved funding amount is dispensed using the ATM if the transaction identifier is validated.

The invention further provides an exemplary system for transferring funds. The system comprises a host computer system including a web server computer that is configured to receive money transfer requests from senders. An ATM system is in communication with the host computer system and includes a network of ATM machines that are configured to dispense funds. The host computer system is configured to receive and validate a payment vehicle associated with a funds transfer request and to transmit a transaction identifier to a user computer. Also, the ATM system is configured to receive the transaction identifier from one of the ATM machines, to validate a corresponding transaction identifier received from the host computer system and to dispense funds associated with the transaction identifier using one of the ATM machines. In one aspect, the host computer system is further configured to determine ATM machines near a pick-up location of the receiver and to transmit from the web server computer information on such ATM machines. Optionally, the host computer system may further be configured to generate a pass code and to transmit the pass code to a sender. Also, the ATM system may be configured to validate the pass code before dispensing funds to the receiver.

In one aspect, the host computer system may further be configured to transmit an electronic message to the receiver with the transaction identifier. The host computer system may also be configured to transmit a message to a phone of the receiver with the transaction identifier. In a further aspect, the host computer system may further be configured to maintain status information on the request to transfer funds and to transmit the status information to the sender using the web server computer. This may include transmitting a notice to the sender when the funds have been dispensed. In a particular aspect, the web server computer may be configured to generate a web page with fields for entering information on the sender and a transfer amount. The web server computer may also be configured to elicit information on the payment vehicle.

One particular method involves a stored value account that may be used, for example, to make internet payments, and that can be credited using a variety of payment techniques. Such a method involves receiving money at a money transfer location from a potential purchaser. The money is then stored as an electronic record in a stored value account of the purchaser. This money is then available for transfer at the request of the purchaser. Upon such a request, the money may be electronically sent to a recipient and the stored value account may be debited.

For example, the money transfer location may include a device that is communicable with a host computer so that the stored value account may be stored in the host computer. The purchaser may then make the request to transfer money using any type of computer that may communicate with a server computer over the Internet. In this way, a purchaser who wishes not to provide financial information over the Internet may create a stored value account using traditional techniques, such as making a cash payment at a money transfer location. These funds are then available to be used over the Internet without disclosing financial information.

By permitting funds to be received at a money transfer location, a variety of payment types may be used. For example, payments may be made by cash, checks, credit cards, debit cards, and the like.

The invention provides another method for transferring money from a sender to a recipient while permitting the recipient to receive the money in a variety of payment forms and/or at different times. According to the method, money is received from the sender (e.g., at a money transfer location) along with information on the recipient that is to receive the money. An electronic record of the money and the intended recipient is created, and the recipient is provided with various payment options for receiving the money. The recipient then requests payment using one or more of the payment options, and payment is made according to the requested payment option. An electronic record of the payment is also created.

Examples of payment options include a cash pick up at a provider location, a hand delivery to the recipient in cash, a hand delivery to the recipient in a money order, a crediting of an account of the recipient, a debit or stored value card, and the like. Further, the request to receive the payment may be made in a variety of ways, such as by a telephone request, by a computer request over a network, by a letter, by an in-person visit, by a voice response unit request, by a personal digital assistant request, and the like.

In one aspect, the card comprises a closed-loop debit card. Such a debit card may be used at any location that is configured to accept such a card. For example, the debit card may comprise an anonymous debit card, e.g. one associated with MasterCard, VISA, Discover, and the like, that is initialized when the request for payment by the recipient is made. As another example, the debit card may comprise a stored value card that is loaded with a record of the value upon request for payment by the recipient. As a further example, the debit card may comprise a phone card or an internet cash card. These cards may be loaded with phone minutes or other value as payment to the recipient.

When issuing a card at the time of payment, the debit card may be initialized using a point of sale device to associate an account of the debit card with the electronic record of the money. As an alternative, a receipt may be printed with a point of sale device that has account information that is associated with the electronic record of the money. In some cases, the receipt may be used in place of the debit card. For example, the receipt may include an identifier that may be used when making internet purchases. As another example, the receipt may comprise a sticker having the account information that is placed onto a debit card.

The transferred money may be deposited into a wide variety of accounts. For example, the money may be transferred into a bank account of the recipient upon presentment of an account number or a MICR number from a check of the recipient. As another example, the money may be deposited into an on-line funds account, such as an on-line money transfer account, an on-line bank account, an on-line investment account, an on-line auction account, and the like. As a further example, the money may be transferred into a bank account of the recipient by providing a debit card and performing a reverse or return transaction using a point of sale device. As yet another example, the recipient may receiver a sender key and a confirmation code from the sender. This information may be input into an appropriate ATM or kiosk device to receive the transferred money.

When using a point of sale device to pay to accounts using an account number, a variety of equipment may be used. For example, the account information may be obtained from a MICR reader that reads a MICR line from a check of the recipient, a mag stripe card reader that reads a mag stripe from a card of the recipient, a keypad that permits manual entry of the account information, an OCR scanner or imager that reads the account from a statement of the recipient, a biometrics device that identifies a pre-registered recipient who is tied to the account, and the like.

In one aspect, the recipient may be provided with a list of fees associated with each type of payment option. Such a method also allows for the splitting of transaction costs between the sender and the recipient. For example, the sender may pay all or part of the transaction fees and the recipient may pay all or part of the transaction fees in any proportion. Further, the payment of transaction fees may be decided solely by the sender, by the recipient, or by mutual agreement.

The recipient may also be provided with the option of receiving portions of the money at different times. In this way, the recipient does not need to pick up the transferred money at a single time. If the recipient requests payment of the money at multiple times, an electronic record may be made for each partial payment. Further, transaction fees may be deducted each time a partial payment is made.

Conveniently, the recipient may be sent a message with the payment options. This message may be an e-mail, a letter, a telephone call, a facsimile, a telegram, or the like.

In a further embodiment, the invention provides a method for transferring money from a sender to a recipient by receiving money from the sender along with information on the recipient that is to receive the money. The sender also indicates that the money is to be stored on a stored value card. An electronic record of the money and the intended recipient is also created. When ready to receive the money, the recipient makes a request, and a stored value card is generated having the value of the money. An electronic record of the payment is also electronically stored.

These and other embodiments of the present invention are described in more detail in conjunction with the text below and attached figures.

BRIEF DESCRIPTION OF THE DRAWINGS

A more complete understanding of the present invention may be derived by referring to the detailed description and claims when considered in connection the figures, wherein like reference numbers refer to similar items throughout the figures, and:

DETAILED DESCRIPTION OF THE INVENTION

The invention provides various equipment and techniques for moving money. The invention permits money to be received in some form and then electronically transferred to another location where it available for pickup or further processing. In order to make a money transfer transaction, an interface with the money transfer system is needed. Accordingly, a wide variety of interfaces may be used to access the money transfer system. For example, the money transfer system may be accessed by walking into a money transfer or provider location and tendering payment, using a telephone to contact an IVR system or a customer service representative, over the Internet using any type of device capable of communicating over the Internet, including personal computers, cell phones with browsers, PDAs and the like. These interfaces may be accessed by both the sender and the recipient.

The invention further permits a wide variety of payment instruments to be used to tender payment. For instance, payment may be tendered in cash, by credit card, debit card, stored value cards, including smart cards, using an Automated Clearing House (ACH) transfer from a bank account, using a cash card, and the like. Similarly, a wide variety of payment techniques may be used once the money has been transferred. For instance, the recipient may be paid by cash, by check, by money order, by crediting a bank account, by crediting a stored value card or stored value record, and the like. Further various payment techniques may be used to provide the recipient with the money. These include permitting the recipient to personally receive the money at a money transfer location, by an ACH transfer to a bank account, by a Fed wire to a bank account, using ATMs, kiosks, stored value cards, automated check printers, and the like.

Various combinations of the above may be practiced according to the invention. For example, any of the access methods may be used with any of methods for tendering of payment or receiving payment. Further, any of the above may be used with any of the payment devices. Moreover, a recipient may be used to access the system in order to request money from one or more senders.

Figure 1A:
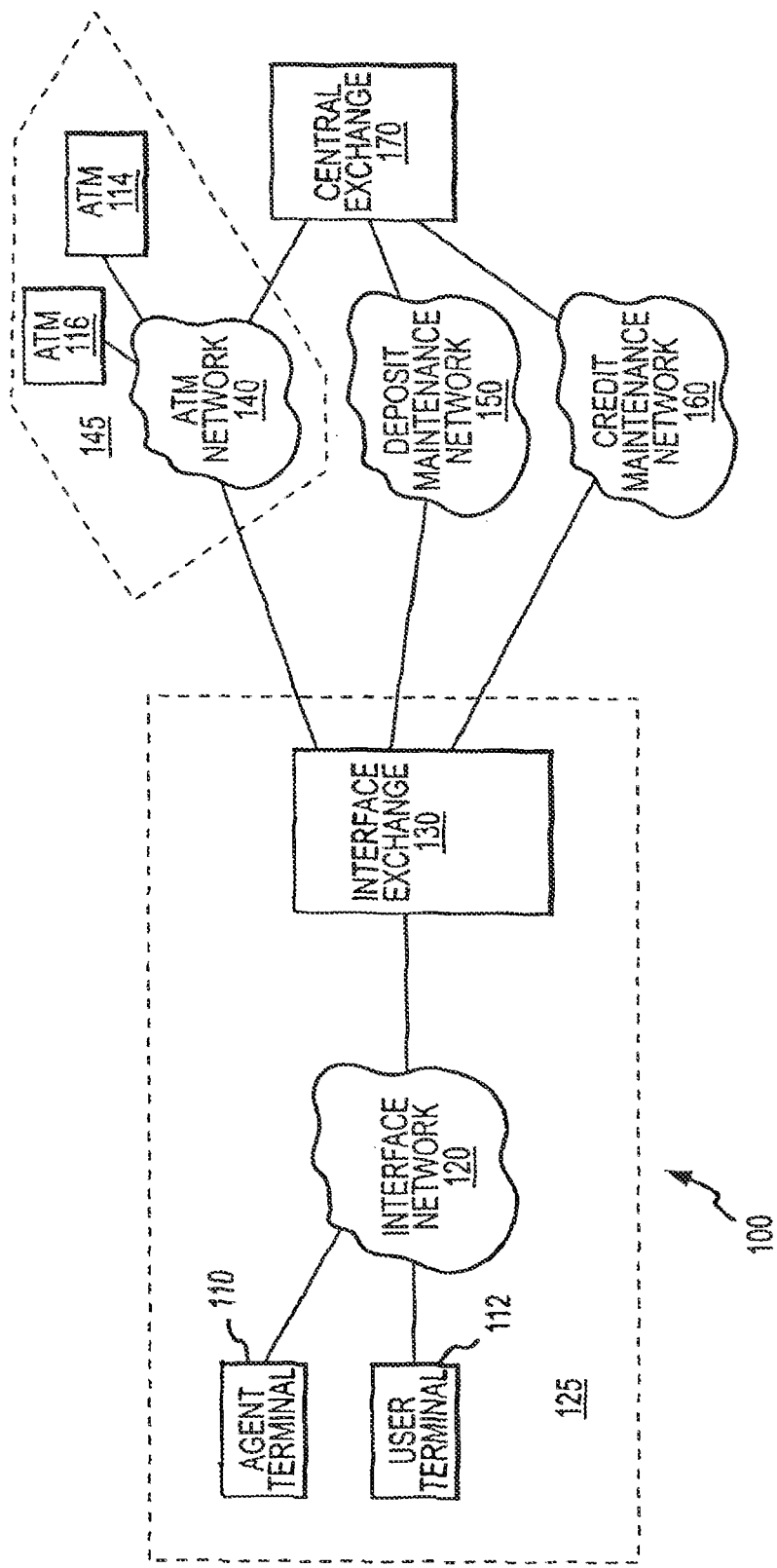
FIG. 1A illustrates an embodiment of a transfer network including input and output mechanisms according to the present invention.

Referring to FIG. 1A, one embodiment of a transfer system 100 according to the present invention is described. Transfer system 100 is comprised of an interface system 125, an automatic teller system ("ATM") system 145, a deposit maintenance network 150, a credit maintenance network 160 and a central exchange 170. Interface system 125 is communicably coupled to ATM system 145 via an ATM network 140, deposit maintenance network 150 and credit maintenance network 160. In general, interface system 125 unifies a variety of transfer systems while supporting a variety of mechanisms for introducing and receiving information to and/or from transfer system 100.

Interface system 125 is described in greater detail hereinafter with respect to FIGS. 1B and 1C, and generally comprises an interface exchange 130, a provider terminal 110 and a user terminal 112 in communication via an interface network 120. Interface network 120 provides message based communications between provider terminal 110 and user terminal 112 and interface exchange 130. In alternative embodiments, interface network 120 provides for communication between provider terminal 110 or user terminal 112 and interface exchange 130, but not between provider terminal 110 and user terminal 112. In some embodiments, interface network 120 comprises a TCP/IP compliant virtual private network (VPN). However, it should recognized that other communication networks could be used to provide similar functionality. For example, interface network 120 could be the Internet, a local area network (LAN), a wide area network (WAN), a telephone network, a cellular telephone network, a virtual private network (VPN), an optical network, a wireless network, or any other similar communication network.

Figure 1B:
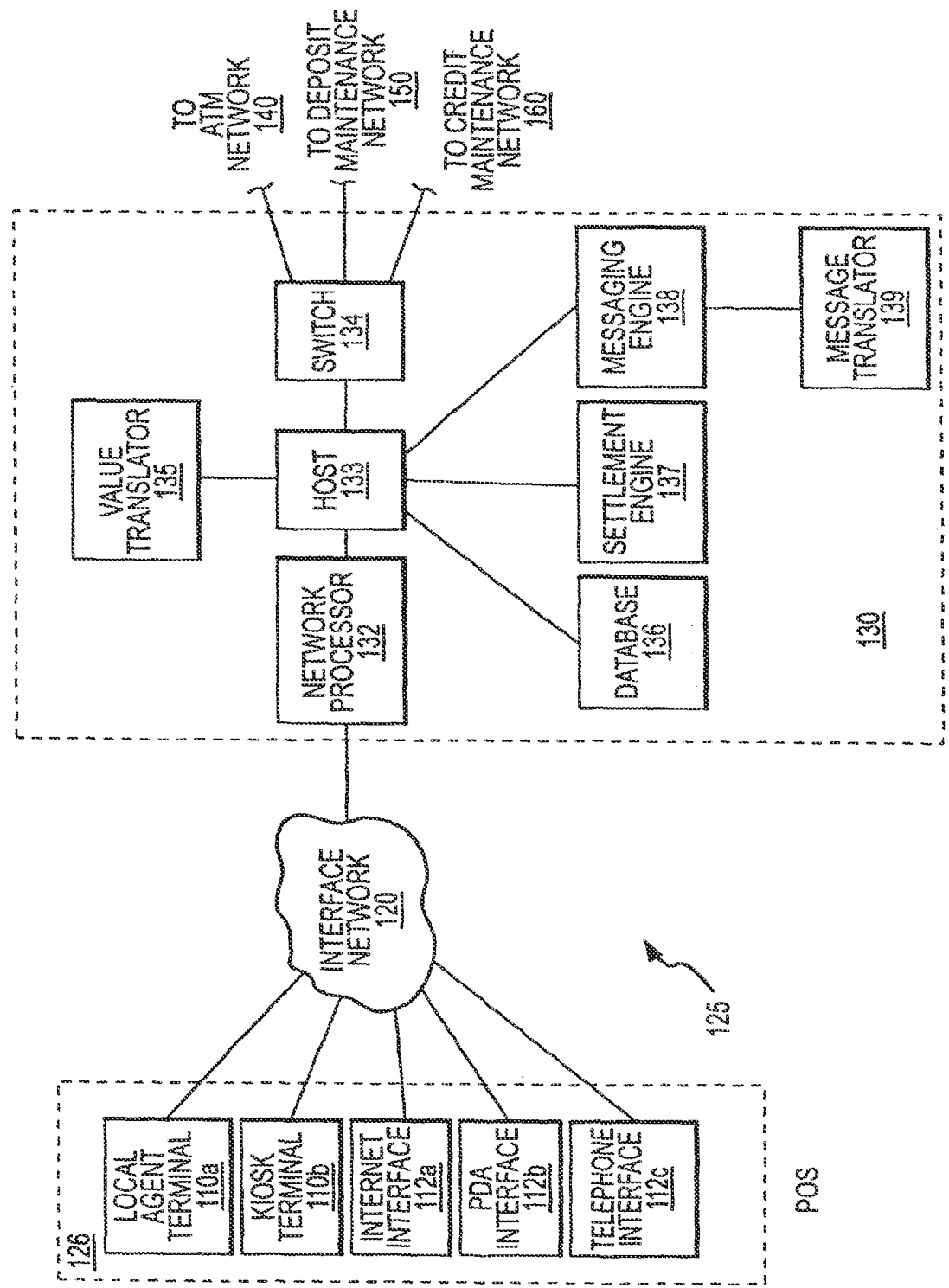
FIG. 1B illustrates an interface system of the network of FIG. 1A.

Referring to FIG. 1B, interface system 125 is described in greater detail. Interface system 125 provides access into transfer system 100 and permits a wide variety of payment instruments to be used to receive payments. For example, money to transfer may be made by presenting cash, checks, stored value cards, credit cards, debit cards, cash cards, by an ACH transfer from a bank account, and the like. To accommodate such payment instruments and types, various input devices 126, such as terminals or interfaces may be used. For example, a local provider terminal 110a may be used to accept cash, credit cards, checks, debit cards, stored value cards and smart cards. Such terminals may also be used at the payout end to print a check or money order, or to credit a cash card or stored value card. Examples of such terminals are described in copending U.S. application Ser. No. 09/634,901, entitled "POINT OF SALE PAYMENT SYSTEM," filed Aug. 9, 2000 by Randy J. Templeton et al., which is a nonprovisional of U.S. Prov. Appl. No. 60/147,899, entitled "INTEGRATED POINT OF SALE DEVICE," filed Aug. 9, 1999 by Randy Templeton et al, the complete disclosures of which are herein incorporated by reference.

A kiosk terminal 110b may also be used and will be described with reference to FIG. 1C. In so doing, it will be appreciated that terminal 110b may be used to make payments to a recipient as well as to receive money from a sender. Terminal 110b includes a controller 200 that communicates with various devices such as a computer 202, a PDA port 204, a telephone 206, a card reader 208, a card writer 210, a card issuer 212, a message issuer 214, a cash issuer 216, and a check printer 218. Terminal 110b may include some or all of these devices. Computer 202 may include standard computer components as is known in the art, such as a screen display, one or more input devices, such as a keyboard, a pointing device, a touch screen, a speaker for voice recognition, and the like. In this way, various information regarding the money transfer may be input into the transfer system. Computer 202 may communicate with interface network 120 using a variety of communication techniques including via an internet interface 112a, a dedicated telephone line, and the like. Conveniently, computer 202 may include a web browser to produce web pages as is known in the art. Hence, with computer 202 a user may input the payment type, such as a credit or debit card number, stored value account information, loyalty program account information, and the like, along with information on the recipient. This information may then be processed by interface exchange 130 to complete the transaction.

PDA port 204 permits a PDA device to be coupled to terminal 110b. In this way, a transfer may be made directly from the sender's PDA which may conveniently be preprogrammed with various information relating to the transaction, such as account numbers, information on the recipient, and the like. In this way, transactions may be made in a manner similar to that using computer 202, but with the sender's personal PDA device. If needed, controller 200 may communicate with a PDA interface 112b in order to communicate with interface network 120.

Telephone 206 permits transactions to be staged by voice. For example, by using a telephone interface 112c, various aspects of the transfer transaction may be given over telephone 206. For example, telephone 206 may be used to call a customer service representative to have a transaction staged. The sender may then receive a transaction number that may be given to a provider when presenting the money to transfer. The provider may use this number to access the staged information, thereby speeding up the transaction. Alternatively, such a transaction may be accessed at computer 202 by inserting the number to permit the staged transaction information to be accessed. Payment information may then be obtained at kiosk 200, such as by inserting cash, a check, a credit, debit or smart card, or the like into an appropriate reader. As an alternative to using a customer service provider, the transaction information may be entered using an IVR system that records the information and submits it to interface network 120.

Telephone interface 112c may also be used to permit cell phone users to access the transfer system. In this way, cell phone minutes or other stored values associated with the cell phone may be transferred using system 100. Further, telephone interface 112c permits money to be withdrawn from the transfer system. For example, a phone may be used to make a request to have money withdrawn from a bank account, credit card account, stored value accept, or the like. This may be done by calling the bank account or credit card organization directly and requesting a withdrawal at a given location. The bank or credit organization may then contact interface exchange 130 to make the funds available at the requested location, such as at a local provider terminal.

As another example, a cell phone may be used to access a point of sale device, kiosk, local provider terminal or the like using a telephone interface of one of those devices. A request may then be made to interface exchange 130 for the funds. A value or foreign currency conversion may be performed by interface exchange 130 as described herein and an authorization may be sent back to the location where the request was made to payout the funds. In this way, a person in a foreign country may easily access cash by simply locating a provider, kiosk or the like, using a cell phone to request money, and then receiving the payment in the local currency. Optionally, a verification step may be required, such as by requesting the entry of a PIN to ensure the correct recipient is receiving the money.

Card reader 208 may be used to enter a variety of information. For example, a sender may have a card with various pre-stored transaction information, such as the sender's name, identification number, payment instruments, and the like. These may be used to populate a transaction screen on kiosk 110b. Card reader 208 may also be used to read information from credit, debit, smart and stored value cards. In this way, a sender may provide the system with the money or value to transfer simply by inserting the card with the desired account information into card reader 208. Further, reader 208 may be used to read information from an ID or payment card of a recipient who is to receive a transferred value.

Card writer 210 permits information to be encoded and stored on a variety of cards. For example, information on each transaction may be stored on a customer card of the sender. Card writer 210 may also be useful when the kiosk serves to pay money or value to a recipient. For example, writer 210 may be used to add value to a stored value or smart card of a recipient.

In some cases, cards may be issued to either a sender or a recipient using card issuer 212. For example, a customer card may be issued to a sender who registers with the system. Card issuer 212 may also be used to issue cards when making payments to recipients. For example, card issuer 212 may issue stored value cards, smart cards, cash cards and the like. These may be used at other kiosks or ATMs to withdraw the transferred money or value.

Message issuer 214 permits a message transmitted from a sender to be provided to a recipient. Message issuer 214 may be used to produce the message on a display screen of computer 202 or to print the message which is dispensed to the recipient.

Cash issuer 216 is used to dispense cash to a recipient. In this way, a recipient may receive a cash payout from a kiosk which has been sent from a sender using any of the techniques described herein. The cash payout may be made once the recipient is properly identified, such as by inserting a customer card into card reader 208 and optionally by entering a PIN. Cash payouts may also be made by inserting a card having a stored value that is stored within interface exchange 130. In this way, once a recipient that has been issued a stored value card, the recipient may take that card to any kiosk for partial or full payment. Further, conversions may be made when making the withdrawal. For example, a recipient may have a stored value card with cell phone minutes, and may request that these be converted to cash. Also, foreign currency conversions may be made. Such a transaction is facilitated by interface exchange 130 as described herein.

A sender may also access the money transfer system using his or her own communication devices. For example, by using an internet interface 112*a*, transfer system 100 may be accessed by any type of computer that is capable of accessing the internet. Information on the payment instrument or type may then be communicated to transfer system 100 through the internet. Such payment instruments or types include credit cards, debit cards, stored value cards, cash cards, ACH bank transfer information, and the like. As another example, a PDA interface 112*b* may be used to permit PDA devices to communicate with transfer system 100. Similar payment instruments and payment types may also be presented using PDA interface 112*b*. Another example is through a telephone interface 112*c*. In this way, communications may be made over the telephone, to a customer service representative, through an IVR system, and the like. Similar to the other interfaces, a wide variety of payment instruments and types may be communicated into the system through this interface, including credit cards, debit cards, stored value cards, cash cards, ACH bank transfer information, and the like.

After passing through interface network 120, the information regarding the transfer is sent to interface exchange 130 that has a network processor 132 to process the data. This is then sent to a host 133 that may communicate with a value translator 135, a database 136, a settlement engine 137 and a messaging engine 138 that in turn may communicate to a message translator 139. The information received by interface exchange 130 may include information on the sender, information on the recipient, the type and amount of payment, a desired location to transfer the money, and the like. In some cases, a value translator 135 may be needed to change the type of value. For example, value translator 135 may do a foreign currency conversion, or may transfer from one type of value to another, e.g. frequent flier miles to dollars. All information that is processed may conveniently be stored in database 36.

Settlement engine 137 may be used to facilitate the crediting and debiting of various accounts during a transfer. For example, if a sender requests that funds from a credit card account be used in the transfer, settlement engine 137 is used to contact the credit network to charge the card and to manage the fees involved in the transaction. Such fees may be those charged by the credit organization as well as internal fees that are a part of the money transfer transaction. Settlement engine 137 may be used in a similar manner when crediting or debiting checking accounts, stored value accounts, customer loyalty points and the like.

In some cases, the sender may also wish to send a message with the money. Such a message may be a simple greeting, business or legal terms, and the like. Messaging engine 138 is employed to convert the message to the proper format depending on the type of output device that is to be used with receiving the money. For example, the output device may be a printer that physically prints the message onto some type of media. Alternatively, the message may be temporarily displayed on a display screen, such as on a kiosk, ATM machine, point of sale device, an e-mail, a web page or the like. The sender or recipient may also indicate that the message needs to be translated to a different language. In such cases, message translator 139 may be used to translate the message into the other language. This may be accomplished by simply doing a word look up for each corresponding word in the other language. More complex language translation capabilities may also be used.

Once the transfer request is properly processed, it is sent by a switch 134 to the appropriate network as shown. This may be to ATM network 140, deposit maintenance network 150 and/or credit maintenance network 160 to complete the transaction. As described hereinafter, in some cases the entire money transaction may occur without assistance from any of these networks, such as when transferring money between one stored value account and another. Optionally, the transaction may also make use of central exchange 170 which may comprises the Federal Reserve System, an association of banks, such as NACHA, a cell phone network, or the like.

With such a configuration, a wide variety of payment options are possible. For instance, the sender may request that the funds be withdrawn from a sender's bank account. In such as case, interface exchange 130 communicates with depositing maintenance network 150 to make the withdrawal. This transaction may also involve central exchange 170. Once the funds have been withdrawn, they may be retrieved by the sender using a wide variety of techniques. For example, the funds may be paid out to the recipient by delivery to a provider location, at a kiosk, at a point of sale device, at an ATM, via the internet using a stored value account, at the recipient's bank account after a Fed wire or an ACH transfer, by a stored value card or a smart card, by a cash card, and the like.

As one specific example, a sender may request that the money be available for pick-up at an ATM or a bank. In such cases, the money may be deposited into a recipient's bank account using deposit maintenance network 150. One example of such a system for transferring money into a recipient's bank account is described in copending U.S.

application Ser. No. 09/516,209, filed Feb. 29, 2000, the complete disclosure of which is herein incorporated by reference. However, other systems may also be used. Central exchange may facilitate this transaction by doing a wire to the bank accounting using the Federal Reserve System, by an ACH transfer, or the like. In this way, the money may be retrieved using an ATM, by visiting the bank, or by any other withdrawal technique offered by the bank. For example, payment may be made by cash, by a printed check, by crediting a smart card or stored value card, or the like. This may be done by providing the ATM or other payout device, such as a kiosk, with the appropriate equipment for making such payments. As another example, interface exchange 130 could maintain a stored value account for the recipient. Funds may then be withdrawn from ATM 114 using any of the techniques described herein, and the account debited once ATM network 140 communicates with settlement engine 137. Also, once a stored value account has been created, the funds may be withdrawn using a wide variety of other techniques, such as by depositing them into a bank account of the recipient, by crediting a credit card account of the recipient, and the like.

If a credit card is involved in the transaction, either for sending or receiving, credit maintenance network 160 may be accessed. For example, if the sender uses a credit card, interface exchange 130 accesses credit maintenance network 160 via settlement engine 137 to approve the funds and to send a request to charge the credit card account. Once the funds are available, they may be paid out to the recipient using a wide variety of techniques, such as by delivery to a provider location, at a kiosk, at a point of sale device, at an ATM, via the internet using a stored value account, at the recipient's bank account after a Fed wire or an ACH transfer, by a stored value card or a smart card, by a cash card, and the like in a manner similar to that described herein. The payment may also be credited to the recipient's account by having settlement engine 137 send it a credit request to credit maintenance network 160.

Check printer 218 may be used to print a check to a recipient. In this way, payouts may be made in the form of a check. Although not shown, an imager may also be used to scan checks so that money to be transferred may be input in the form of a check. Printer 218 may also be used to print a receipt for a given transaction.

Figure 1C:
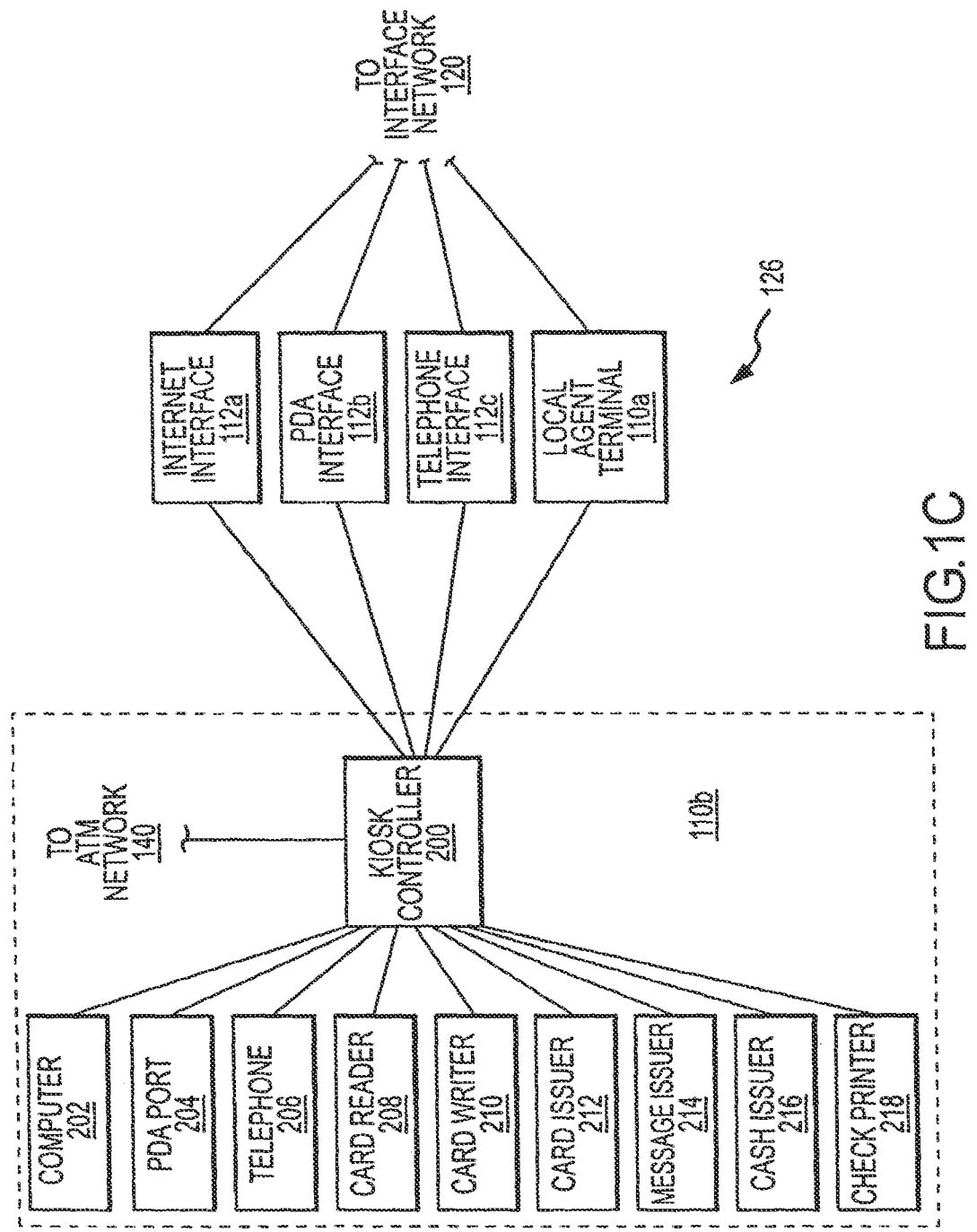
FIG. 1C illustrates the input mechanisms of the network of FIG. 1A.

As shown in FIG. 1C, kiosk controller 200 may also be configured to communicate directly with ATM network 140. In this way, the kiosk may function as an ATM in addition to being able to perform money transfer functions as described herein.

It will be appreciated that some or all of the components of kiosk 110b may be incorporated into other devices that are used to access system 100. For example, such components may be used in a provider terminal, a point of sale device, an ATM machine, and the like. Further, kiosk 110b may be configured to communicate with a local provider terminal 110a as shown in FIG. 1C to communicate with interface network 120.

Figure 1D:
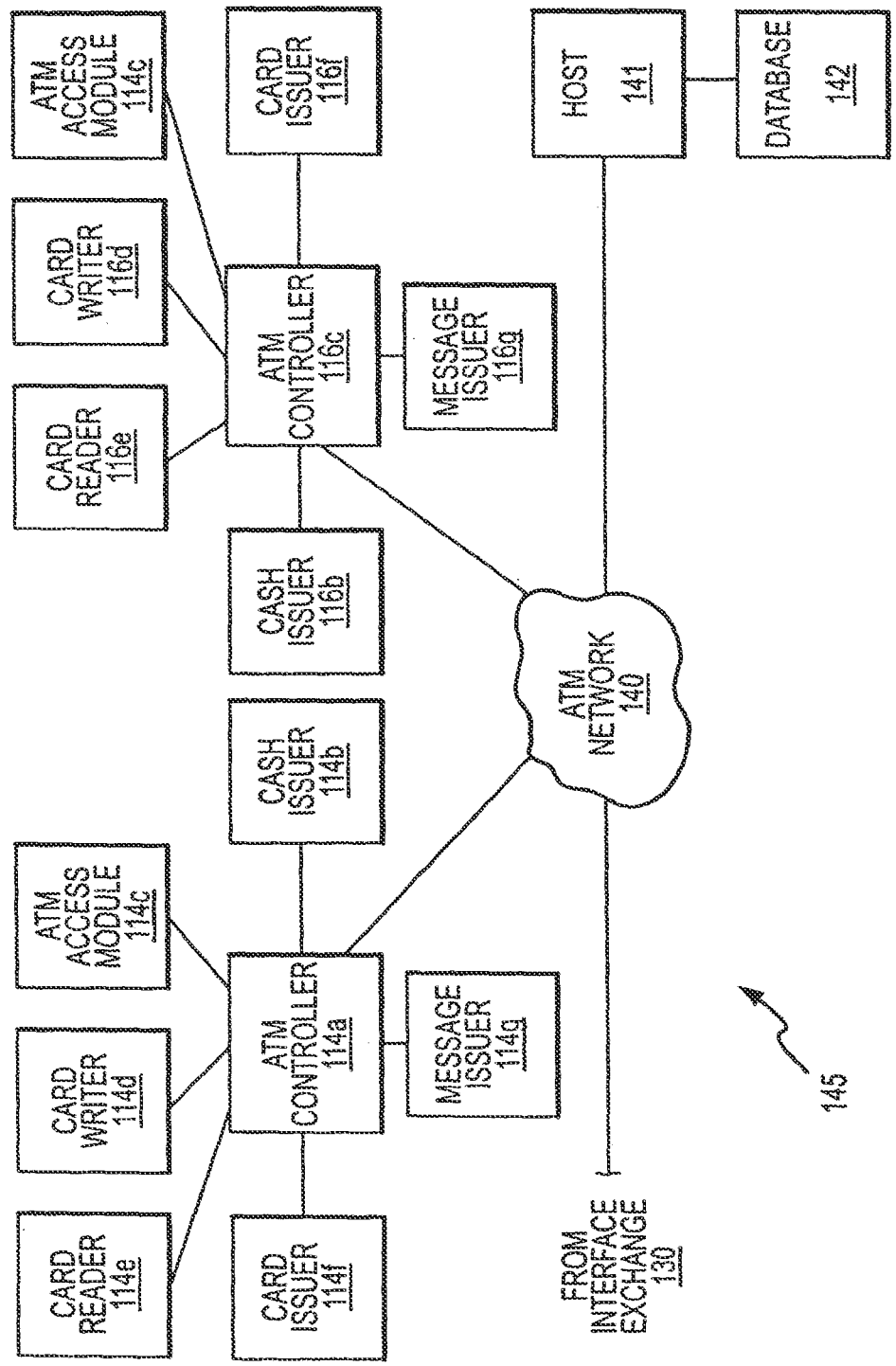
FIG. 1D illustrates an ATM network included in the network of FIG. 1A.

Referring to FIG. 1D, ATM system 145 will be described in great detail. ATMs 114 and 116 each include a controller 114a and 116a, that are coupled to cash issuers 114b and 116b, ATM access modules 114c and 116c, card writers 114d and 116d, card readers 114e and 116e, card issuers 114f and 116f and message issuers 114g and 116g. Cash issuer 114 is employed to dispense cash to a recipient based on a previous transfer. Access module 114c provides access to the ATM using a variety of components, such as a touch screen, a keyboard, a voice recognition system, and the like. In this way, various information regarding a transfer request or a pick up may be entered into controller 114a. Card writer 114c and card reader 114e permit various information to be written onto various cards and read from various cards in a manner similar to that previously described in connection with kiosk 110b. Card issuer 114f permits various cards to be issued in a manner similar to that previously described in connection with kiosk 110b. Message issuer 114g permits various messages to be provided to the user in a manner similar to that described in connection with kiosk 110b.

The ATMs communicate with each other over ATM network 140. ATM system 145 includes a host 141 that is coupled to a database 142 to facilitate the processing and storing of data that is transferred between each ATM. With such a configuration, money transfers may be made between ATMs simply by coupling to interface exchange 130. For example, information about a transfer may be input into ATM 114 using access module 114c and optionally also card reader 114e. The request is sent from ATM network 140 to interface exchange 130 which processes the transaction in a manner similar to that previously described. The money may then be withdrawn by the recipient at any other ATM simply by accessing the ATM through access module 114. The transferred money may then be dispensed from cash issuer 114b.

The ATMs may also be used as a payout device in connection with any of the other transfer techniques described herein. For example, money to be transferred may be provided using any of the input devices 126. A request may also be made to have the money available at an ATM. The money may then be retrieved from the ATM, either by debiting the account stored at interface exchange 130 or by depositing the funds into a bank account of the recipient as previously described.

Figure 2:
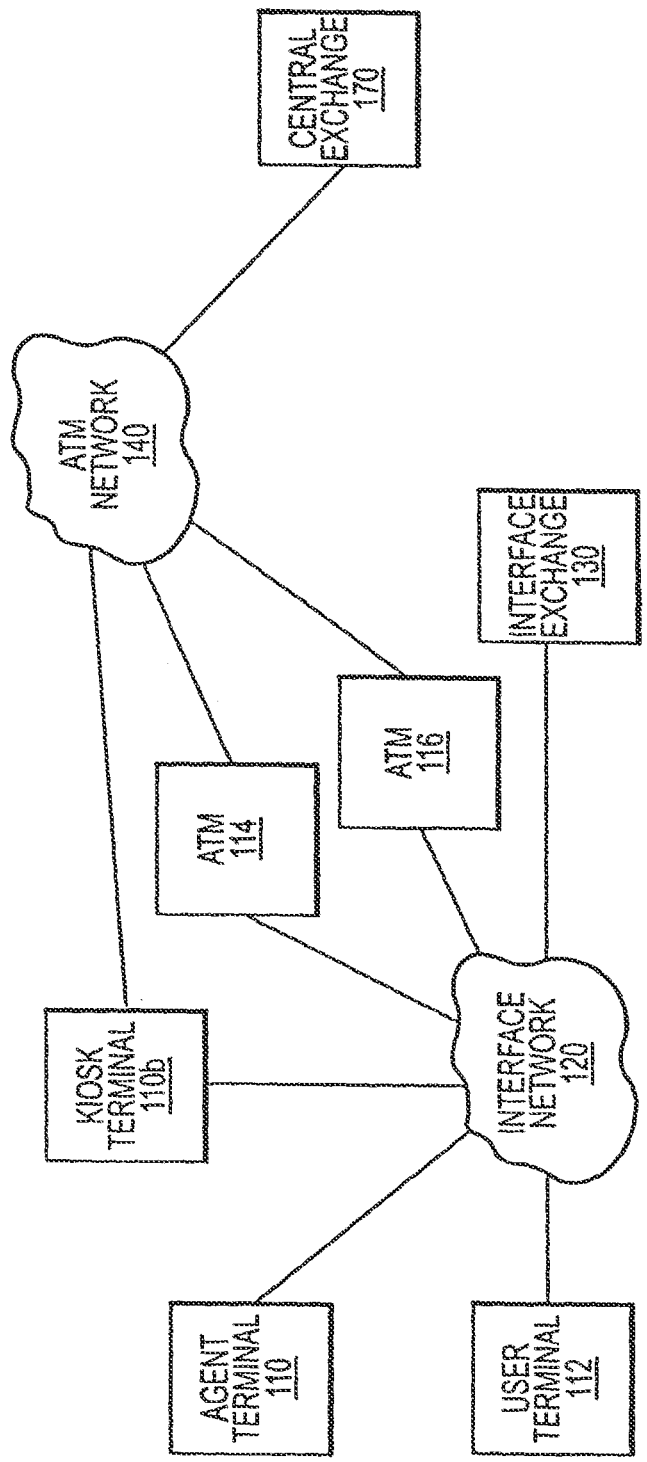
FIG. 2 illustrates an alternative embodiment of a transfer network according to the invention.

It should be recognized that other embodiments of transfer system 100 are possible according to the present invention. For example, another embodiment of a transfer system 101 is illustrated in FIG. 2. In this embodiment, transfer system 101 comprises provider terminal 110, user terminal 112, kiosk terminal 110b, and ATM's 114, 116 in communication via interface network 120. Interface exchange 130 exchange functionality previously described in relation to FIG. 1B. Each of kiosk terminal 110b and ATM's 114, 116 can communicate via ATM network 140 to central exchange 170. In this way, transfers as previously described involving central exchange 170 can be accomplished without a direct interface between interface exchange 130 and ATM network 140 or other networks. Rather, such transfers can be accomplished by providing dual communication functionality in kiosk terminal 110b and/or ATM's 114, 116.

Figure 3:
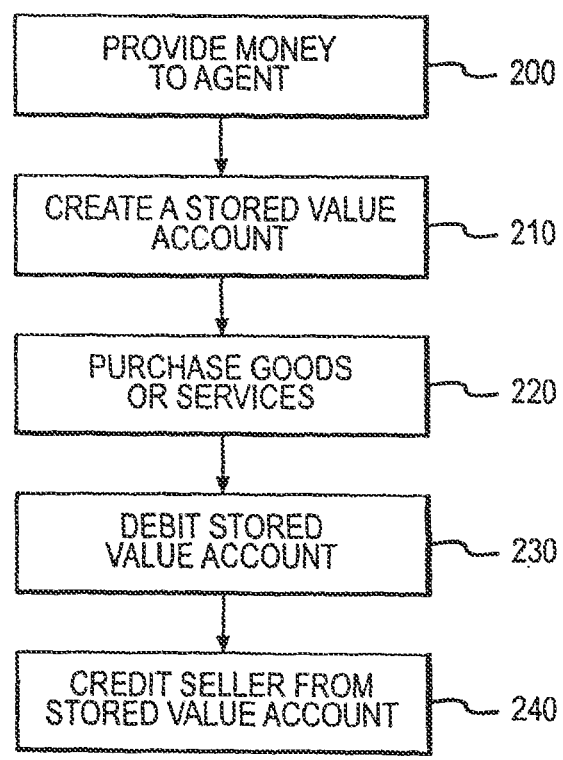
FIG. 3 is a flow chart illustrating one method for transferring money using a stored value account according to the invention.

Referring now to FIG. 3, one method for transferring money using the transfer system previously described will be set forth. Such a method is particularly useful in creating a stored value account that may be used to make internet or other electronic payments without disclosing any account information to the seller or recipient. As shown in step 200, a user provides the money to a provider of the money transfer system. This payment may be made in any form accepted by the provider who keeps this information confidential. The payment information may be input into the local provider terminal (see FIG. 1B). As shown in step 210, a stored value account is credited with this payment. This may occur within interface exchange 130 (see FIG. 1B). The money may be placed into the stored value account by having the sender designate the user's stored value account, or the user may contact interface exchange 130 and request that the funds be placed into the user's stored value account.

The user may then make a desired purchase as shown in step 220. As one example, the purchase may be made over the internet. When payment is requested, the user may access his stored value account, using for example, internet interface 112a (see FIG. 1B). One convenient way to permit the stored value account to be used for payment is to provide a link at the seller's web site to the web site managing the stored value account. Information on the transaction may then be provided to permit the stored value account to be debited as shown in step 230 and to credit the seller as shown in step 240. This transaction may be performed using settlement engine 137 of interface exchange 130 (see FIG. 1B). A wide variety of seller accounts may be credited, including a checking account, a credit card account or a stored value account using techniques previously described.

One advantage of such a method is that information about both a buyer and a seller may be kept confidential. For example, a buyer may pay money into the system which is transferred to the seller, without any knowledge of the buyer if the buyer chooses. In a similar manner, any data on the seller may be kept from the buyer.

In one alternative, money paid into the system may be at the request of a recipient. For example, money may be paid in to obtain a stored value card or to pay for services, such as a pre-paid telephone service. In such cases, the user may be prompted to enter how much money is to be paid. For example, the message may be that $50 is required in order to prepay for telephone minutes. The information is provided into the system from the recipient. The sender may also be provided with the option of varying the amount that is paid in, along with the addition of a message.

Figure 4:
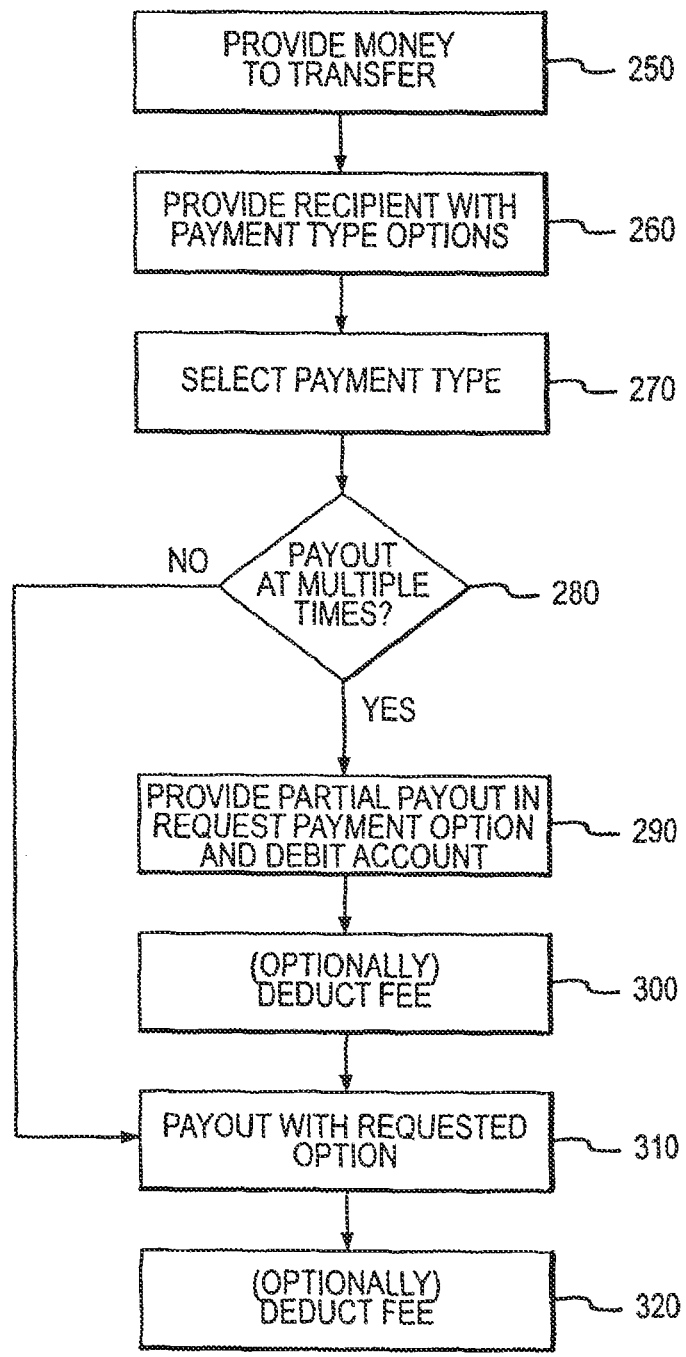
FIG. 4 is a flow chart illustrating one method for transferring money using various payment types and times according to the invention.

FIG. 4 illustrates a method for transferring money where the recipient has the option of receiving the money in different payment types and at different times. The process begins at step 250 where the money to be transferred is entered into the money transfer system. Conveniently, the sender may have the option of sending a message along with the money. This may be received in any language requested by the sender or the recipient using the message translator 139 (see FIG. 1B). In some cases, the message may be separate from the money transfer. For example, the money may be electronically transferred to a recipient's bank account while a message is sent to a printer or to a computer of the recipient to notify the recipient of the transfer. This may be useful, for example, when making a payment of aggregated bills. The payments may be aggregated and sent to the recipient's bank account, and a separate receipt sent to the recipient giving the details of each payment.

When ready to receive the money, the recipient accesses the money transfer system using any of the techniques described herein. The recipient is provided with a variety of payment options as shown in step 260. This may be, for example, payment in cash, check, money order, a stored value card, a deposit into a checking account, a credit to a credit card account, or the like. Further, the recipient may request payment in any currency or other type of stored value using value translator 135 (see FIG. 1B). For example, if living in Mexico, the recipient could request payment in Pesos, and could also request that any message be delivered in Spanish. The recipient selects the payment type as shown in step 270 and is then provided with the option of receiving a full payment, or partial payments over time as shown in step 280. If full payment is selected, the process proceeds to step 310 where full payment is made according to the requested payment type. Optionally, a fee may be charged according to the payment type as shown in step 320. If a partial payment is selected, the process proceeds to step 290 where a partial payout is made according to the requested payment type and the stored value account is debited. A fee may optionally be deducted as shown in step 300. At any time, the recipient may again access the money transfer system to receive the rest of the transferred money.

Figure 5:
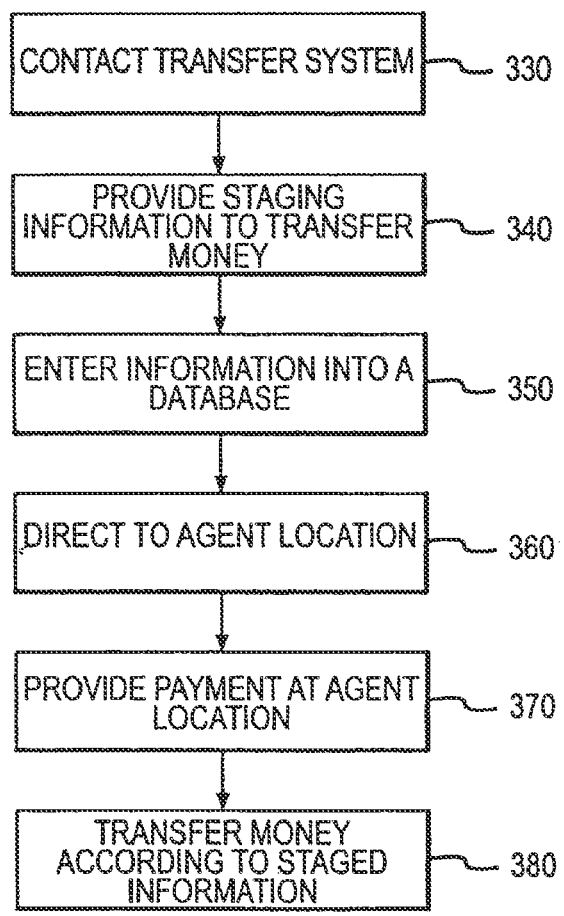
FIG. 5 is a flow chart illustrating one method for staging a money transfer transaction according to the invention.

FIG. 5 illustrates a method for staging money transfer transaction information into the transfer system before presenting payment at a physical location in order to reduce the transaction time or simply to assist in the transaction. For example, a customer may access the money transfer system through the internet or a customer service representative. In some cases, the sender may not qualify for a credit card payment or may simply experience a difficulty in completing the transaction. In such cases, the process proceeds by contacting the transfer system as shown in step 330. The information needed to stage the transaction is then provided as shown in step 340 and then stored in a database as shown in step 350, such as within interface exchange 130 (see FIG. 1B). Optionally, the sender may be giving a transaction number or other identifier and is then directed to a provider location as shown in step 370. The sender provides this information to the provider who enters this into the system, such as by using the local provider terminal 110a (see FIG. 1B). This causes the corresponding record in the database to be accessed and sent to the provider terminal to automatically populate fields on the screen. All the sender is then required to do is to provide the proper payment to the provider. The money may then be transferred using any of the techniques described herein as shown in step 380.

Further, it will be appreciated that a variety of other transfer methods may be performed using the transfer system described herein. For example, to expedite a money transfer transaction, senders may be provided with customer cards having staging information stored on the card. Such information may include, for example, the sender's name, account number, contact information and the like. This card may then be read using the provider terminal 110a (see FIG. 1B) to populate the fields displayed on the display screen. The sender may then present payment along with information on the recipient.

In some cases, the recipient may wish to withdraw the transferred money from an ATM. However, in order to access existing ATMs, a user must present some type of card. As such, after a transaction is sent, the transfer system may deliver an ATM access card to the recipient by some type of mailing method. A separate mailing may optionally be done to provide a PIN to the recipient. This card may include information that is readable by the ATM to permit access so that the money may be withdrawn. Such cards may also function as cash cards or other type of stored value cards so that the money may be withdrawn based on information supplied by the card, rather than by accessing the money transfer system. As another option, the ATM may be configured to be accessed with any type of card, such as a driver's license, ATM card credit card, and the like. Once accessed, a home screen may be displayed that permits access to interface exchange 130 (see FIG. 1B) to complete the money transfer as previously described.

The transfer system may also find use in cases where individuals do not have a credit or debit card to make internet purchases. In such cases, a customer may go to a provider location and purchase a cash card (that may be a physical or a virtual card, i.e. an identification number) using local provider terminal 110a (see FIG. 1B). The cash card is used by the money transfer system as a pointer to a record of the money paid by the customer into the system and that is available for transfer. Hence, after making an internet purchase, the customer may provide the seller with information from the cash card. The seller then presents this information to the money transfer system which checks the information and then transfers the money to the seller using any of the techniques described herein.

In some cases, interchange fees may be used when making transfers using a credit card. To avoid such fees, a money transfer may be made using a check, debit card, an ACH transfer to a bank account or the like. In such cases, the payment may be made at a provider location, over the internet, or using other techniques described herein. The money transfer system then waits for the funds to paid before making the funds available. Once available, the recipient may receive the funds in cash from the money transfer system, such as by picking up the funds at a provider location.

As another example, a deliverer of goods may use the transfer system to reduce or eliminate the amount of cash received and carried during daily deliveries. Currently, when delivering goods, the delivery person is provided with payment at each location where goods are delivered. The cumulated payments are then deposited at the end of the day. However, the delivery person faces the risk of being robbed or of misplacing the payments during the daily activities. According to the invention, the transfer system is able to use a point of sale terminal, such as the local provider terminals 110a (see FIG. 1B) to credit a stored value card carried by the delivery person. In this way, each time a delivery is made, the card is presented to the buyer who updates the card with a credit using the terminal. The transfer system is also able to debit a stored value of the buyer, or may ask for some other form of payment that is entered into the terminal. When required, such as at the end of the day, the delivery person may take the stored value card to his own terminal to update the credits into the transfer system. Of course, payouts may be made using any of the techniques described herein, including crediting of bank or credit card accounts, payment of cash from an ATM, and the like. By using such a card, the delivery person does not need to carry large amounts of cash throughout the day.

The transfer system may also be used to facilitate business to business transactions as well. For example, a merchant may keep a computerized record of their accounts payable using software known in the art. Periodically, multiple payments may be made by simply loading the accounts payable information into the money transfer system, such as by using a connection to the local provider terminal 110a or through internet interface 112a (see FIG. 1B) along with a request to have the payments made. These payments may be made using any of the techniques described herein, including by cash, credit card, debit card, stored value account, or the like. Using messaging engine 138 (see FIG. 1B), a message may also be sent to each recipient giving information about the account. Each recipient may also be given the option of taking payment in any of the payment forms as described herein. Conveniently, the merchant may have recipient profiles stored within the transfer system, so that payments may automatically be made according to the profile each time a request is made.

Hence, the payment systems of the invention are configured to provide a wide variety of techniques for presenting funds from a money transfer receive transaction to a customer. These include, for example, the use of a closed-loop debit card that may be used at customized ATMs for cash or in-lane purchases if within a subscribing network. For instance, a debit card may be loaded with funds and then used within a network of a given retailer or association of retailers to make purchases. Further, an anonymous debit card may be used, such as those offered by MasterCard, VISA, Discover, and the like. In such cases, funds may be provided to a money transfer location to set up an account. A card may then be initialized and provided to the recipient with a PIN or other identifier. Other types of cards that may be used to receive funds include stored value cards, pre-paid phone cards, pre-paid internet cash cards and the like.

When funds are paid out in connection with a card, the recipient's card may be presented to any of the terminals described herein, such as a POS device, which communicates with interface exchange 130. The terminal reads the number off of the card to associate the card account with the transferred funds. For example, a recipient may enter identification information, such as their name, into a POS device to access the record of the funds to be paid. The card may then be swiped on the POS device to read the card number and to permit the card account number to be associated with the funds. The funds may then be credited to the account using any of the techniques described herein. In some cases, the sender may dictate that the funds are to be paid out in the form of a stored value card. The sender may also indicate the type of value to be stored on the card, e.g., money, phone minutes, and the like.

As another option, the card number may be assigned dynamically by the host system, such as interface exchange 130, and then a receipt issued to the recipient that contains an account number. For example, a terminal, such as a POS terminal, may issue a paper receipt or a sticker that may be placed onto a card or other media and which contains the account number. Value from the account number may be redeemed using interface exchange 130 using any of the techniques described herein.

The payment systems of the invention may also be used to pay funds to a bank account of the recipient using a MICR number from one of the recipient's checks. For example, the recipient may submit the MICR number to interface exchange 130 using any of the interfaces described herein, including a POS device having a reader. In this way, the recipient may receive the funds by entering identifying information into the POS device and then swiping the check through the POS device to read the MICR line. Once the account information is read, it is transferred to interface exchange 130 where the funds may be deposited into the recipient's account using the techniques described herein. Similar techniques may also be used to transfer funds to the recipient's bank account using the recipient's debit card. For example, the recipient's debit card may be swiped at a POS terminal to create a reverse or return transaction where the recipient's account is credited with the transferred funds. Interface exchange 130 may make use of deposit maintenance network 150 to perform this transaction in a manner similar to that previously described.

As another example, payment funds may be automatically transferred to an on-line investment account or an on-line bank account. This account may be maintained by an investment service or bank that may access interface exchange 130 using any of the techniques described herein. The funds may be transferred into this account in a variety of ways. For example, the sender may designate the recipient's account so that when information on the payment reaches interface exchange 130, switch 134 (see FIG. 1B) routes information on the payment to the investment service or bank where the funds may be deposited into the designated account. Alternatively, a recipient may have a record in database 136 that any funds to be received from any source, or from specific sources, be transferred automatically to the on-line account. As another example, a record of the funds transfer may be maintained at interface exchange 130 until the recipient is notified and then specifies that the funds should be placed in the on-line account. The actual transfer of funds may be made using any of the techniques described herein, such as by an ACH transfer.

In a similar manner, funds may be transferred to an account of an on-line purchase service. In this way, transferred funds may be accessed by a user to make purchases using an on-line auction or purchase site.

Finds may be transferred to a person's bank account using a reverse or return transaction. For example, a user may present their debit card along with payment at a location having a POS device. The card is read by the POS device, and a reverse or return transaction is performed to credit the bank account associated with the debit card. In this way, the funds may be automatically credited to the user's bank account.

Another technique for paying out funds is by having the sender generate a sender key at the time of payment. This sender key may be transmitted to interface exchange 130 using any of the techniques described herein. Alternatively, the sender key may automatically be generated by interface exchange 130. The sender then provides the sender key to the recipient using any technique, such as, for example, by telephone, e-mail, regular mail, facsimile, in person, or the like. Optionally, the sender key may be stored on some type of media, such as a card, that is sent to the recipient. Interface exchange 130 also generates a confirmation code. This confirmation code may be accessed by the recipient by interfacing with interface exchange 130 using any of the techniques described herein. With the sender key and the confirmation code, the recipient may access an ATM, kiosk or the like that is coupled to interface exchange 130 and receive a cash payout at the ATM or kiosk. For example, the recipient may access ATM 114 of ATM network 140 to receive a payout. Conveniently, a card may be inserted into the ATM to gain access to the ATM functions or to provide the ATM with the sender key. Optionally, the payment made at the ATM or kiosk may be in any of the forms described herein, including the crediting of a stored value card, the crediting of a bank account, or the like.

When receiving payment, a variety of techniques and equipment may be used to facilitate entry of information relating to the payment. For example, a MICR reader may be used to read a MICR line from a check of the recipient to permit interface exchange 130 transfer the funds to a bank account of the recipient. A card reader may be used to read the magnetic stripe from a card containing information on an account of the recipient. This information may be transmitted to interface exchange 130 to permit such an account to be credited. A keypad or keyboard may also be used to permit account information to be entered. For example, a keyboard may be used to enter recipient account information into a web site or other on-line screen for on-line or internet accounts that are to receive the funds. Another option is the use of an OCR scanner or other reader to permit OCR or other account information, such as bar codes, to be read into the system. For example, a recipient may wish to use the transferred funds as payment for an outstanding bill, such as a loan payment, phone or utility bill. In such cases, the account information may be scanned off of the bill or invoice and sent to interface exchange 130 that may transmit the funds to the holder of the outstanding bill using any of the techniques described herein. Still further, various biometrics equipment may be used to identify an existing customer that is tied to an account. Examples of biometrics that may be read include facial recognition, fingerprint, retinal or iris scanning, and the like. This information may be transmitted to interface exchange 130 that may include an engine determine the recipient and then perform a look-up in the database to determine the recipient's account. The funds may then be transferred to this account.

Figure 6:
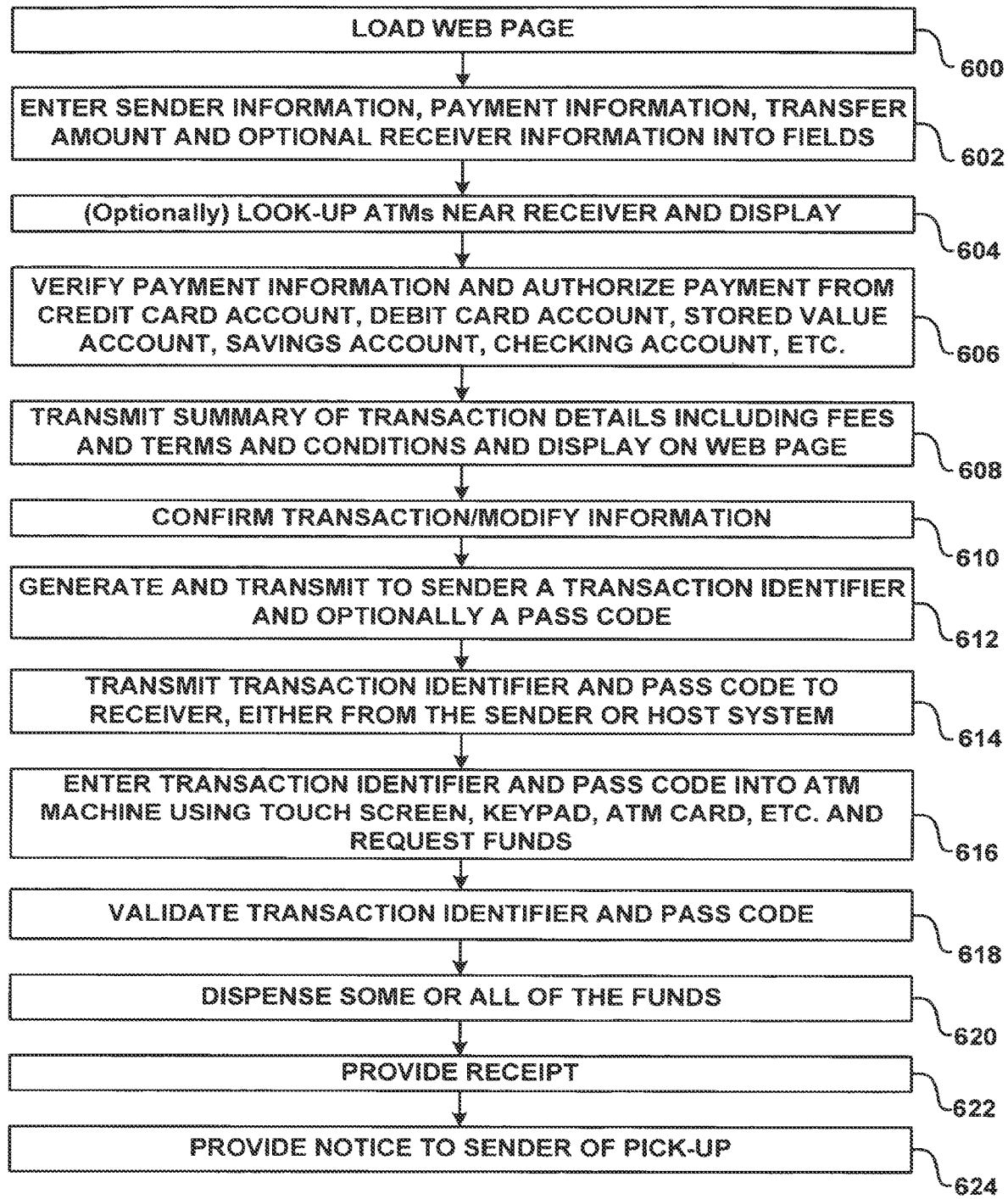
FIG. 6 illustrates one exemplary method for transferring funds according to one embodiment of the invention.

FIG. 6 illustrates one exemplary method for transferring funds according to one embodiment of the invention. The method outlined in FIG. 6 may be implemented using any of the systems described herein. For example, in order to enter information needed to initiate a funds transfer, such as from any computer capable of running a web browser or other GUI, network interface 120 may be used. This may be the Internet or other type of network. In order to provide funds for the transfer, interface exchange 130 may obtain such funds from deposit maintenance network 150, credit maintenance network 160 or the like using a debit card, credit card, stored value account, or the like. Interface exchange 130 may also be used to facilitate other parts of the transfer, such as by providing a transaction identifier, pass code, PIN or similar information used to identify a given transaction. Also, interface exchange 130 may communicate with ATM network 140 so that the funds may be picked up using ATMs 116. Interface exchange 130 may further be used to track the status of transactions and to send various notices or information to the sender and/or the receiver.

As shown in FIG. 6, a sender may perform a funds transfer transaction by accessing a web page from any type of device capable of communicating over a network, such as the Internet. Devices capable of displaying a web browser or other GUI interface include personal computers, laptops, cell phones, PDAs and the like. This is shown in step 600. In step 602, the sender is prompted to input various information needed to initiate a transaction. This may be done using the same web page or various other pages. Information that may be input includes information on the sender (name, address, phone, etc.), payment information (such as an account where the funds may be accessed), a transfer amount, information on the recipient (name, address, phone, etc.) and the like. This information may be input into various fields and transmitted over a network, such as the Internet, to a host computer system. The host may comprise one or more server computers, databases and the like as is known in the art.

In one optional step 604, the sender may request information on ATMs near the receiver where the funds may be withdrawn. The host may determine this information and transfer it to the sender for convenient viewing on a display screen. In some cases, this information may also be accessed by the receiver in a similar manner.

The host computer system may further be employed to verify and authorize the entered payment information as shown in step 606. For example, the sender may request the funds be taken from a credit card account, a debit card account, a stored value account, a gift card account, a loyalty account, a savings account, a checking account, a brokerage account or the like. The host computer system may be used to ensure the account is valid and the funds are available. This may be done through traditional systems (such as those provided by VISA and MasterCard), private or closed loop systems, through banks, other credit card processes, and the like.

As shown in step 608, the sender may be sent various information relating to the transfer. This may include a confirmation of the dates entered by the sender, applicable fees, other terms and conditions and the like. In some cases, the sender may be required to confirm this information before proceeding as shown in step 610. If any of the details are incorrect, the sender may modify the data and transmit it back to the host.

In step 612, the host assigns an identifier to the transaction. Typically, this identifier will uniquely identify the transaction and may be generated upon receipt of a request or otherwise assigned at an appropriate time. Optionally, a pass code, PIN or the like may also be provided by the host.

The identifier and pass code may then be transmitted to the receiver as shown in step 614. This may happen in a variety of ways. For example, the host could transmit the information to the sender's computer in a web page, as a text message or the like. Other ways include by phone, fax, e-mail, regular mail or the like. The sender may then provide this information to the receiver to permit the receiver to pick up the funds.

As an alternative, the host computer system could be used to provide the identifier and/or pass code to the receiver. This could be through an email, phone call, mail, fax or the like. To do so, the sender may provide the host with the receiver's contact information.

When the receiver is ready to pickup some or all of the funds, the receiver goes to an appropriate ATM as shown in step 616. To access the ATM, the receiver could enter an ATM card, select an item from a touch screen, press keys on a keypad, press a "money pick-up" button or the like. The receiver is shown a screen asking the receiver to enter the transaction identifier and optionally the pass code or PIN.

The ATM system then validates the entered data, either within its own system (if forwarded from the host computer system) or communicates with the host to validate the transaction identifier. This is illustrated in step 618.

The receiver may be given the option of receiving some or all of the funds as shown in step 620. This may be displayed on a display screen of the ATM. Once selected, the funds are dispensed in cash as is known in the art. Of course, the funds could be dispensed in other ways, such as by check, gift card, stored value instrument or the like. Also, the receiver could transfer the funds to another account using the ATM.

As shown in step 622, the receiver may also be provided a paper or electronic receipt. Also, the sender may be given notice of the pick-up as shown in step 624. This may occur by having the ATM system send a notice to the host computer system which sends the notice to the sender according to any method requested by the sender, including phone, email, and the like. In a similar manner, the sender can monitor the status of any send transaction. Conveniently, the sender could access a web page to see the status of a send transaction.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

What is claimed is:

1. A system comprising:
   a customer device, comprising;
      one or more processors; and
      memory communicatively coupled with and readable by the one or more processors and having stored therein processor-readable instructions which, when executed by the one or more processors, cause the customer device to:
         receive input data initiating a transaction to transmit a payment from a second party to a first party, wherein the second party is associated with the customer device;
         receive data indicating one or more automatic teller machine (ATM) locations associated with the first party; and
         transmit data identifying payment information between the first party and the second party to a host computer system;
   the host computer system, comprising:
      one or more processors; and
      memory communicatively coupled with and readable by the one or more processors and having stored therein processor-readable instructions which, when executed by the one or more processors, cause the host computer system to:
         receive, from the customer device via a first network interface, payment information between a first party and a second party;
         generate, based at least in part on the payment information, a transaction identifier and an authentication code associated with the transaction;
         receive, from an ATM located at the one or more ATM locations, a payment request comprising the transaction identifier and authentication code;
         verify the received transaction identifier and authentication code, wherein the authentication code is a pass code; and
         authorize, cash payment from the ATM according to the payment information; and
   the ATM comprising:
      a display screen;
      a keypad; and
      a cash receiving and reader slot, wherein the ATM is further configured to:
         output, via the display screen, a first user prompt to input the transaction identifier;
         after receiving the transaction identifier input via the keypad from the second party, output via the display screen a second user prompt to insert the cash payment associated with the transaction into the cash receiving and reader slot; and
         verifying the cash payment received via the cash receiving and reader slot.

2. The system of claim 1, wherein the host computer system further comprises:
   a telephone interface; and
   an interactive voice response (IVR) system,
   wherein the payment information received from the customer device is received via the IVR system of the host computer system.

3. The system of claim 1, wherein the customer device is a mobile phone and wherein the transaction identifier is a phone number of the customer device associated with the second party.

4. The system of claim 1, further comprising:
   an online merchant system corresponding to the first party, comprising:
      one or more processors;
      memory communicatively coupled with and readable by the one or more processors and having stored therein processor-readable instructions which, when executed by the one or more processors, cause the online merchant system to:

receive an online purchase request from the customer device; and in response to receiving the online purchase request, transmit the payment information to the customer device, the payment information including a computer network address of the online merchant system.

5. The system of claim 4, the memory of the host computer system having stored therein processor-readable instructions which, when executed by the one or more processors, cause the host computer system to:

receive, from the customer device via the first network interface, the computer network address of the online merchant system;

transmit a notification to the online merchant system, in response to an indication that the cash payment associated with the transaction identifier has been received by the ATM; and transmit a notification to the customer device, in response to the indication that the cash payment associated with the transaction identifier has been received.

6. The system of claim 4, the memory of the host computer system having stored therein processor-readable instructions which, when executed by the one or more processors, cause the host computer system to:

transmit a confirmation message to the online merchant system to initiate shipment of a good from the first party to the second party, in response to the indication that the cash payment associated with the transaction identifier has been received.

7. A computer-implemented method comprising:

receiving, by a customer device, input data initiating a transaction to transmit a payment from a second party to a first party, wherein the second party is associated with the customer device;

receiving, by the customer device, data indicating one or more automatic teller machine (ATM) locations associated with the first party;

transmitting data identifying payment information between the first party and the second party to a host computer system;

receiving, at the host computer system, from the customer device, payment information between a first party and a second party;

generating, by the host computer system, based at least in part on the payment information, a transaction identifier and an authentication code associated with the transaction;

receiving, by an ATM located at the one or more ATM locations, input data comprising a payment request, wherein the payment request comprises the transaction identifier and the authentication code, and does not include a debit card or bank account number;

transmitting, by the ATM located at the one or more ATM locations, to the host computer system the payment request;

receiving, by the host computer system, from an ATM located at the one or more ATM locations, the payment request;

verifying, by the host computer system, the received transaction identifier and authentication code; and authorizing, by the host computer system, cash payment from the ATM to the first party according to the payment information;

transmitting, by the host computer system, an authorization to the ATM located at the one or more ATM locations to output the cash payment, and outputting, via the ATM, a cash amount that corresponds to the cash payment.

8. The method of claim 7, wherein the host computer system comprises a telephone interface and an interactive voice response (IVR) system, and wherein the payment information from the customer device is received via the IVR system of the host computer system.

9. The method of claim 7, wherein the customer device is a mobile phone and wherein the transaction identifier is a phone number of the customer device associated with the second party.

10. The method of claim 7, wherein the transaction identifier is selected by a party to the transaction, and transmitting, by the host computer system, the transaction identifier to the customer device comprises sending an affirmation of the transaction identifier.

11. The method of claim 7, further comprising:

receiving, from the customer device, a computer network address of an online merchant system associated with the first party;

transmitting a notification to the customer device, in response to an indication from the host computer system that the cash payment associated with the transaction identifier has been received by the ATM; and transmitting a notification to the online merchant system, in response to the indication from the host computer system that the cash payment associated with the transaction identifier has been received.

12. The method of claim 7, further comprising:

transmitting a confirmation message to an online merchant system associated with the first party, to initiate shipment of a good from the first party to the second party, in response to the indication from the host computer system that the cash payment associated with the transaction identifier has been received.

* * * * *